(12) United States Patent
Kumazawa et al.

(10) Patent No.: US 7,058,810 B2
(45) Date of Patent: Jun. 6, 2006

(54) DATA TERMINAL EQUIPMENT

(75) Inventors: Masayuki Kumazawa, Kasuya-gun (JP); Yuji Shimizu, Koga (JP)

(73) Assignee: Matshushita Electric Industrial Co., Ltd., Osaka (JP)

( * ) Notice: Subject to any disclaimer, the term of this patent is extended or adjusted under 35 U.S.C. 154(b) by 800 days.

(21) Appl. No.: 09/866,774

(22) Filed: May 30, 2001

(65) Prior Publication Data

US 2002/0016915 A1     Feb. 7, 2002

(30) Foreign Application Priority Data

May 30, 2000  (JP) .............................. 2000-159839

(51) Int. Cl.
*H04L 9/20* (2006.01)

(52) U.S. Cl. ........................ 713/176; 726/30

(58) Field of Classification Search ................ 713/176, 713/201; 705/51, 1, 57; 726/30
See application file for complete search history.

(56) References Cited

U.S. PATENT DOCUMENTS

| | | | | |
|---|---|---|---|---|
| 5,841,978 A | * | 11/1998 | Rhoads | 709/217 |
| 5,903,892 A | * | 5/1999 | Hoffert et al. | 707/10 |
| 5,905,800 A | * | 5/1999 | Moskowitz et al. | 380/28 |
| 5,926,624 A | * | 7/1999 | Katz et al. | 709/217 |
| 6,018,801 A | * | 1/2000 | Palage et al. | 713/201 |
| 6,243,480 B1 | * | 6/2001 | Zhao et al. | 382/100 |
| 6,247,133 B1 | * | 6/2001 | Palage et al. | 713/201 |
| 6,421,070 B1 | * | 7/2002 | Ramos et al. | 715/763 |
| 6,591,245 B1 | * | 7/2003 | Klug | 705/10 |
| 6,763,370 B1 | * | 7/2004 | Schmeidler et al. | 709/203 |

FOREIGN PATENT DOCUMENTS

| | | |
|---|---|---|
| JP | 11-196262 | 7/1999 |
| JP | 2000-148593 | 5/2000 |

OTHER PUBLICATIONS

Yahoo! Media Relations Yahoo Mail Introduces New Virus Scan Feature, http://docs.yahoo.com/docs/pr/release517.html.*

* cited by examiner

*Primary Examiner*—Kim Vu
*Assistant Examiner*—Andrew L. Nalven
(74) *Attorney, Agent, or Firm*—Wenderoth, Lind & Ponack, L.L.P.

(57) ABSTRACT

A data terminal equipment retrieves index data indicating content data. Then, the data terminal equipment authenticates the content data based on the index data. Only if the authenticity of the content data has been confirmed, the data terminal equipment retrieves the content data from a first server.

32 Claims, 13 Drawing Sheets

DATA TERMINAL EQUIPMENT

BACKGROUND OF THE INVENTION

1. Field of the Invention

The present invention relates to data terminal equipments and, more specifically, to a data terminal equipment included in an information providing system and placed on an information user side for retrieving content data from a server through a communications network.

2. Description of the Background Art

With widespread use of the Internet, a large number of enterprises have set up their own Web pages for introducing their products. To browse these Web pages, information users typically use browsing software (so-called browser) installed on a data terminal equipment. There has been one problem, however, called "spoofing", meaning that an attacker creates an unauthorized Web page disguising itself as an authorized Web page for committing fraud. To prevent such "spoofing", authentication systems for confirming the authenticity of the Web pages have been suggested. One conventional authentication system is described below with reference to FIG. 15.

In FIG. 15, an owner of a Web page Dwp applies for authorization to an authorization agency for getting himself/ herself or his/her Web page Dwp authorized. The authorization agency generates authorization information Itfc from information about the owner or the Web page Dwp received at the time of application. Then, the authorization agency embeds the generated authorization information Itfc as an electronic watermark in a predetermined image Sprd to generate an authentication image Stfc. The authorization agency registers the generated authorization information Itfc in an authentication database (hereinafter, authentication DB) 1001 provided therein. This authentication DB 1001 is accessible by an authentication data terminal equipment 100 managed by the authorization agency. Also, the authorization agency gives the authentication image Stfc to the owner of the Web page Dwp. The owner pastes the received authentication image Stfc onto the Web page Dwp, and stores the same in his/her WWW server 200.

A data terminal equipment 300 on an information user side (hereinafter, user data terminal equipment 300) stores browser software having an authentication function incorporated therein. The user data terminal equipment 300 executes the browser software, and transmits a retrieval request Rrtv for the Web page Dwp to the WWW server 200 through the Internet 400 (refer to a dotted arrow αc). Then, to the user data terminal equipment 300, the Web page Dwp with the authentication image Stfc pasted thereon is transmitted from the WWW server 200 through the Internet 400 (refer to a dotted arrow βc). In response, the user data terminal equipment 300 separates, according to the authentication function incorporated in the browser software, the authentication image Stfc from the received Web page Dwp, and then produces a check request Rchk. The check request Rchk is information for requesting the authentication data terminal equipment 100 to check whether the authorization information Itfc embedded in the authentication image Stfc has been registered in the authentication DB 1001 or not. The user data terminal equipment 300 transmits the produced check request Rchk and the separated authentication image Stfc to the authentication data terminal equipment 100 through the Internet 400 (refer to a dotted arrow γ c).

In response to receiving the check request Rchk, the authentication data terminal equipment 100 extracts, from the authentication image Stfc simultaneously received, the authorization information Itfc embedded as the electronic watermark. Then, the authentication data terminal equipment 100 checks the extracted authorization information Itfc against the authorization information Itfc registered in the authentication DB 1001. According to the check result, the authentication data terminal equipment 100 generates first check information Ichk1 or second check information Ichk2. The first check information Ichk1 indicates that the authorization information Itfc extracted from the authentication image Stfc has been registered in the authentication DB 1001. On the other hand, the second check information Ichk2 indicates that the authorization information Itfc extracted from the authentication image Stfc has not been registered in the authentication DB 1001. This first or second check information Ichk1 or Ichk2 is transmitted through the Internet 400 to the user data terminal equipment 300 (refer to a dotted arrow δ c).

If receiving the first check information Ichk1, the user data terminal equipment 300 causes a screen to display a message indicating that the retrieved Web page Dwp has been authorized. Thus, the information user can know that the Web page Dwp has been authenticated. On the other hand, if receiving the second check information Ichk2, the user data terminal equipment 300 causes the screen to display a message indicating that the retrieved Web page Dwp has not been authorized. Thus, the information user can know that the Web page Dwp may possibly be unauthentic.

However, in the conventional authentication system described above, the information user cannot confirm the authenticity of the retrieved Web page Dwp until he/she receives the Web page Dwp. Therefore, if the retrieved Web page Dwp is unauthentic, the user's access thereto is a waste of time and cost. Moreover, if accessing to a WWW server that stores unauthentic Web pages, the information user may become a victim of cracking; the user's personal information may be stolen, for example. These problems arise not only for the Web page Dwp, but for any data that the information user desires to retrieve, such as text data, audio data, video data, moving-picture data, and software.

Furthermore, in the conventional authentication system, the user data terminal equipment 300 has to access the authentication data terminal equipment 100 at least once. Therefore, traffics over the Internet 400 are increased, and the processing load on the authentication data terminal equipment 100 is also increased.

SUMMARY OF THE INVENTION

Therefore, an object of the present invention is to provide a user data terminal equipment capable of authenticating data before retrieval thereof.

Another object of the present invention is to provide a user data terminal equipment capable of authenticating data without accessing an authentication data terminal equipment.

To achieve the objects above, one aspect of the present invention is directed to a data terminal equipment included in an information providing system and placed on an information user side for retrieving content data provided by a server through a communications network. The data terminal equipment comprises an index retrieval part for retrieving index data indicating the content data; an authentication part f or authenticating the content data based on the index data retrieved by the index retrieval part; and a content retrieval part for retrieving the content data from the server only if the authentication processing part has confirmed the authenticity of the content data.

These and other objects, features, aspects and advantages of the present invention will become more apparent from the following detailed description of the present invention when taken in conjunction with the accompanying drawings.

BRIEF DESCRIPTION OF THE DRAWINGS

FIG. 9 is a block diagram showing the entire structure of a data terminal equipment 3b, which is one exemplary modification of the data terminal equipment 3a;

DESCRIPTION OF THE PREFERRED EMBODIMENTS

Figure 1:
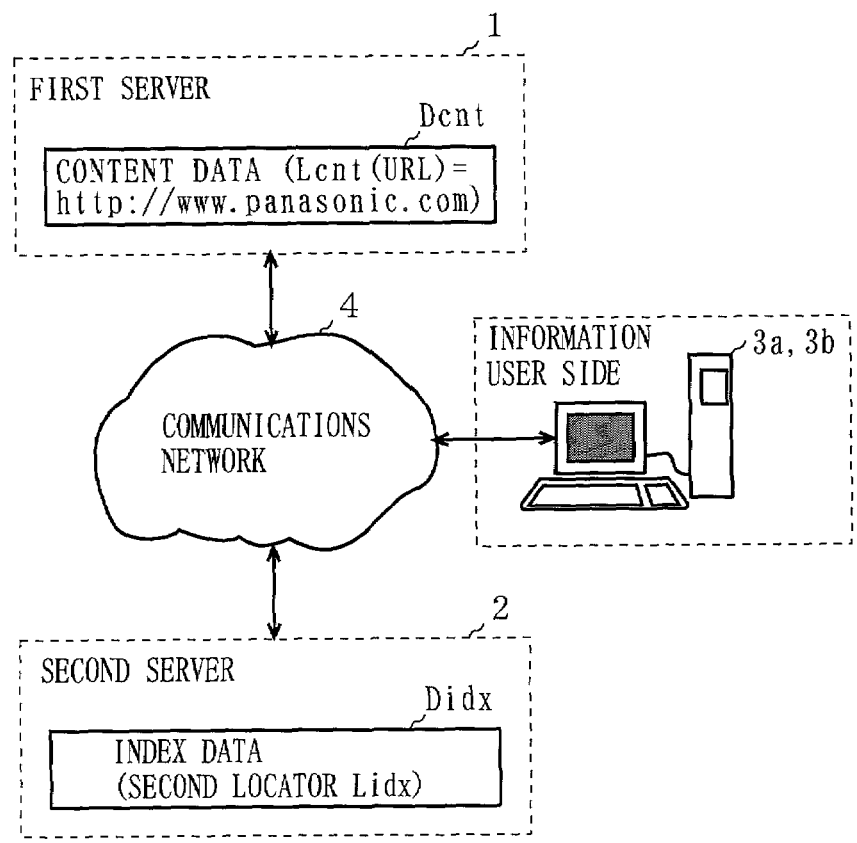
FIG. 1 is a block diagram showing the entire structure of an information providing system according to one embodiment of the present invention.

FIG. 1 is a block diagram showing the entire structure of an information providing system according to one embodiment of the present invention. In the information providing system of FIG. 1, a first server 1, a second server 2, and a data terminal equipment 3a placed on an information user side are so connected to one another through a communications network 4 typified by the Internet as to bidirectionally communicate with one another. Note that a data terminal equipment 3b also shown in FIG. 1 is one exemplary modification of the data terminal equipment 3a, and will be described in detail later.

The first server 1 stores at least one content data Dcnt. The content data Dcnt is any one of text data, image data, video data, audio data, and a software program. Each content data Dcnt is assigned a first locator Lcnt that uniquely specifies a storage location of the content data Dcnt in the information providing system. In the present embodiment, assume that the first server 1 is managed by a corporation. Also assume herein that the content data Dcnt represents a Web page for introducing goods and services offerable by the corporation. Under these assumptions, the content data Dcnt is written with markup language typified by HTML (Hyper Text Markup Language). Also assume that the first locator Lcnt is a URL (Uniform Resource Locator), and exemplified by http://www.panasonic.com.

Figure 2:
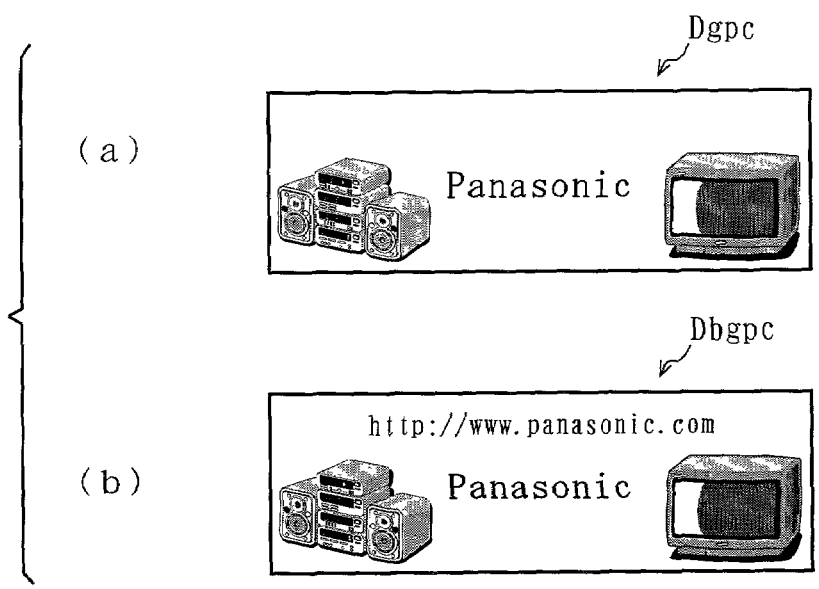
FIG. 2 illustrates one example of images represented by graphic data Dgpc and embedded graphic data Dbgpc, which form a basis of index data Didx of FIG. 1.

A manager of the first server 1 (hereinafter, a first manager) requests a manager of the second server 2 (hereinafter, a second manager) to generate index data Didx so that the content data Dcnt can be browsed by many information users. Prior to this request for the index data Didx, the first manager prepares embedded graphic data Dbgpc. More specifically, the first manager creates graphic data Dgpc that serves as a basis of the embedded graphic data Dbgpc. This graphic data Dgpc may be of any type, generally representing an image that the information user can intuitively associate with the content data Dcnt and the first manager. In the present embodiment, as shown in (a) of FIG. 2, the graphic data Dgpc represents what is called a banner, that is, an image including a trademark and goods of the first manager.

Figure 3:
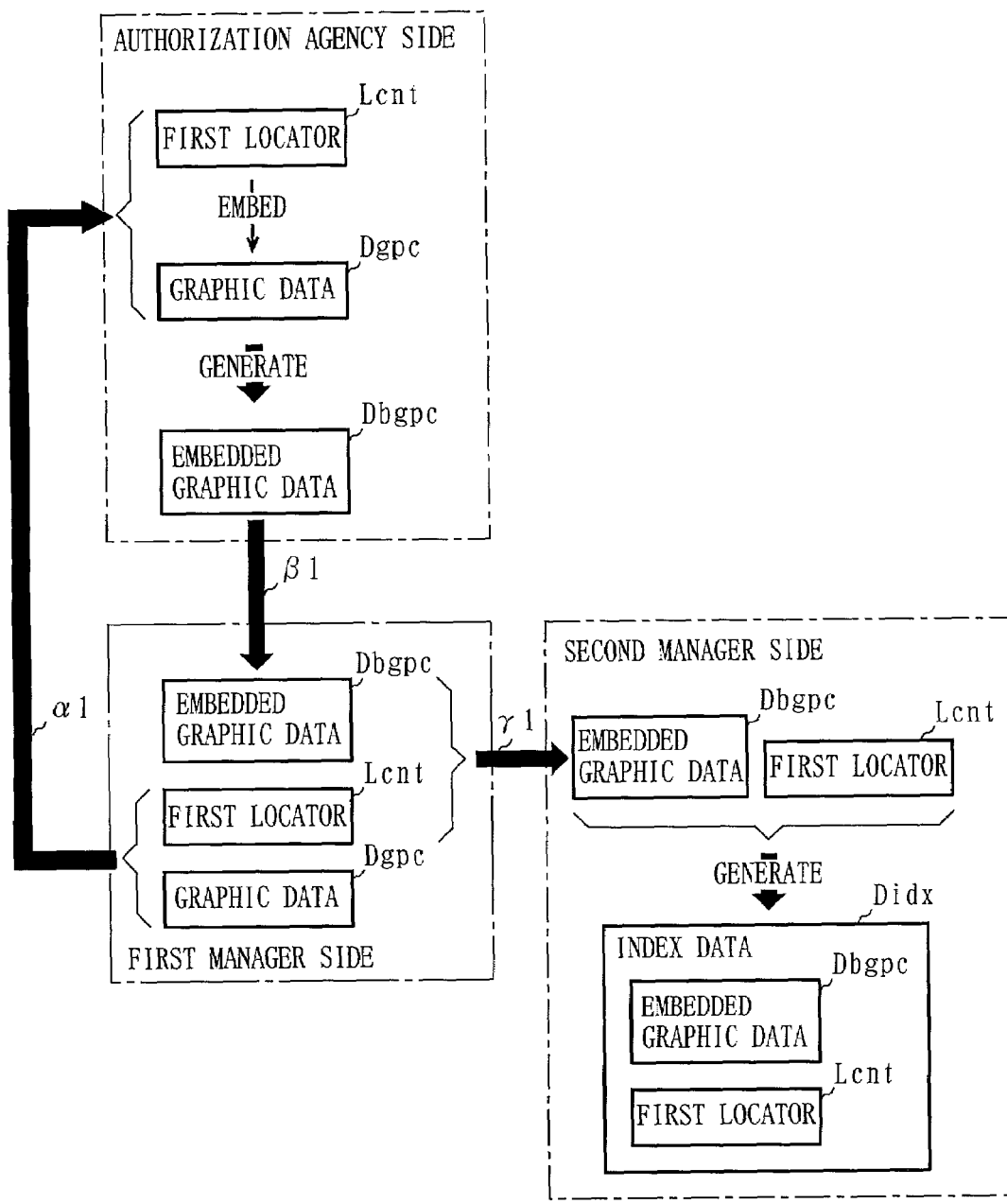
FIG. 3 is a diagram showing the procedure of generating the index data Didx of FIG. 1.

The first manager then supplies the image data Dgpc and the first locator Lcnt to an authorization agency as described in Background Art section (refer to an arrow α 1 in FIG. 3). This process is done for the data terminal equipment 3a to be able to perform authentication (will described later). The authorization agency embeds the first locator Lcnt as an electronic watermark in the graphic data Dgpc to generate the embedded image data Dbgpc. Under the above described assumptions, as shown in (b) of FIG. 2, http://www.panasonic.com is embedded in the banner (refer to (a) of FIG. 2) as the first locator Lcnt. The embedded graphic data Dbgpc is given to the first manager (refer to an arrow β 1 in FIG. 3).

Here, the image represented by the embedded graphic data Dbgpc is viewed by the information user as substantially the same image as that represented by the graphic data Dgpc. In other words, the embedded first locator Lcnt is actually almost invisible to the information user. In (b) of FIG. 2, however, http://www.panasonic com as the first locator Lcnt appears to be viewable. This is only for the purpose of clarifying the difference between the graphic data Dgpc and the embedded graphic data Dbgpc. A technique used for embedding the text-string first locator Lcnt in the graphic data Dgpc is disclosed in Japanese Patent Laid-Open Publication No. 11-196262 (1999-196262), and therefore not described here in detail.

The first manager gives the embedded image data Dbgpc and the first locator Lcnt to the second manager, and requests the second manager to generate index data Didx (refer to an arrow γ 1 in FIG. 3).

Figure 4:
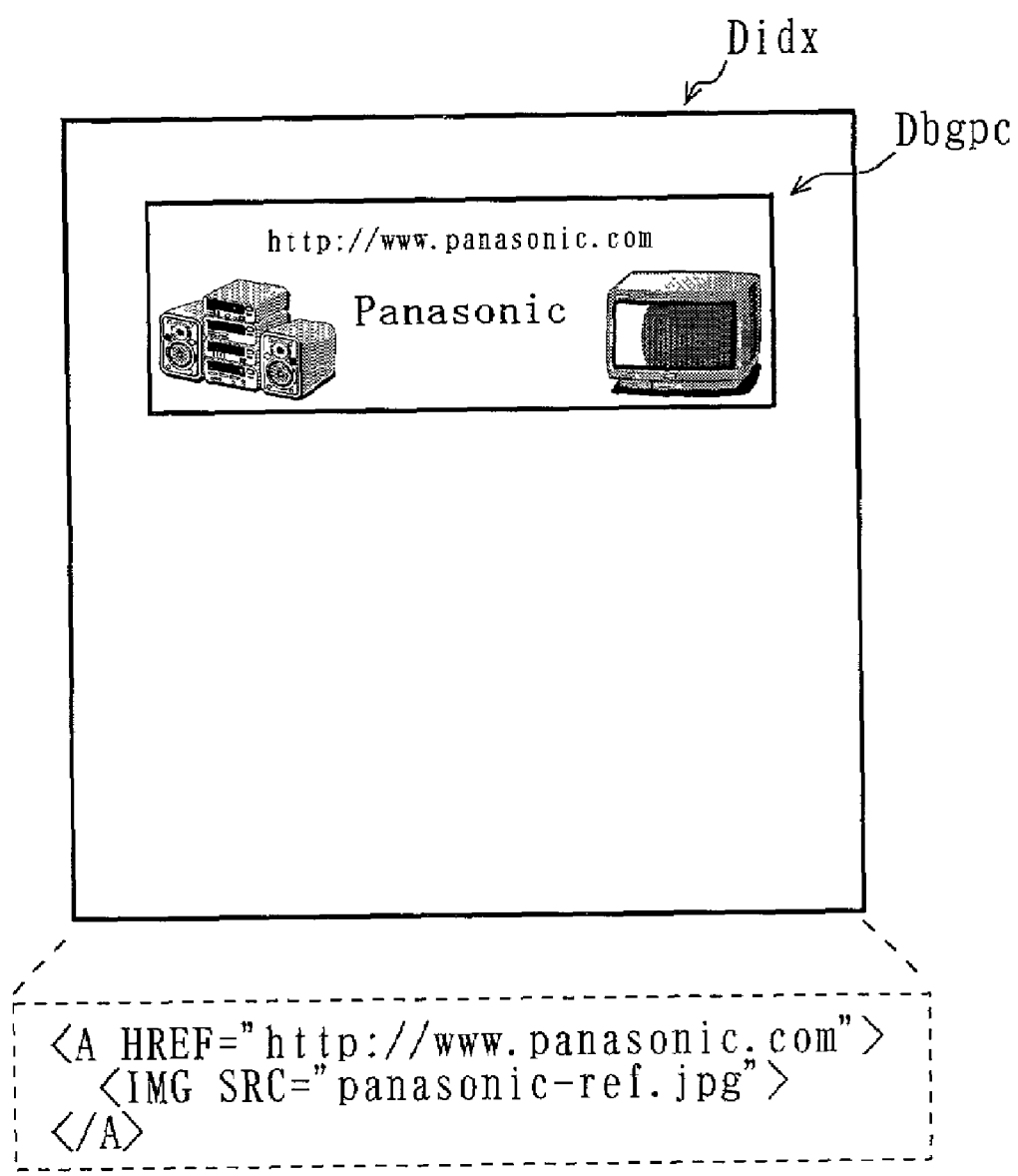
FIG. 4 illustrates an image represented by the index data Didx of FIG. 1.

As stated above, the second server 2 is managed by the second manager. The second manager generates, as shown in FIG. 3, the index data Didx based on the received embedded graphic data Dbgpc and the first locator Lcnt. The index data Didx represents a Web page written typically with markup language, such as a portal site accessible by many information users. The index data Didx includes the embedded graphic data Dbgpc and the first locator Lcnt. More specifically, as shown in FIG. 4, in the index data Didx, a file name assigned to the embedded graphic data Dbgpc is placed between predetermined tags. This makes the image represented by the embedded graphic data Dbgpc serve as a link button on an image represented by the index data Didx and displayed by the data terminal equipment 3a. Also, between the tags, the first locator Lcnt is specified. Therefore, when the information user operates the data terminal equipment 3a to designate the embedded image data Dbgpc, the data terminal equipment 3a can retrieve the content data Dcnt stored at the location indicated by the first locator Lcnt. This makes the index data Didx indicate the content data Dcnt. In other words, the embedded graphic data Dbgpc is linked to the content data Dcnt. Under the above assumptions, if the embedded graphic data Dbgpc is assigned a file name, panasonic-ref.jpg, the index data Didx includes a text string, as enclosed in a dotted box shown in FIG. 4, <A HREF="http://www.panasonic.com"><IMG SRC="panasonic-ref.jp g"></A>.

The above index data Didx is stored in the second server 2, as shown in FIG. 1. Also, the index data Didx is assigned a second locator Lidx for uniquely specifying the storage location of the index data Didx in the information providing system.

Figure 5:
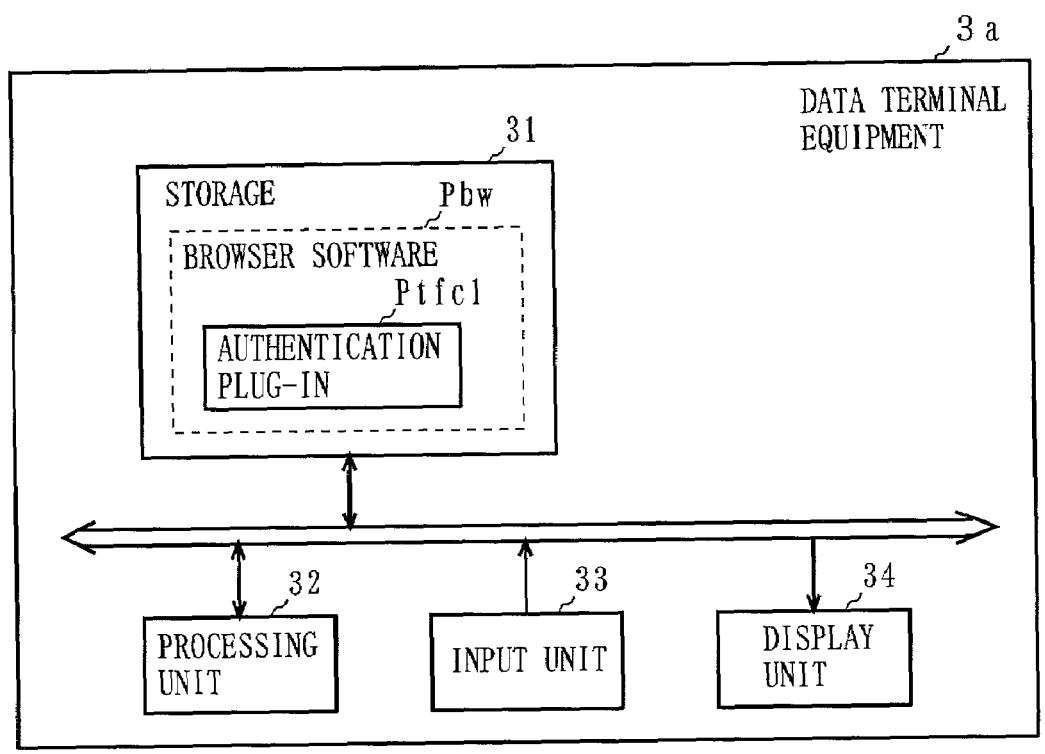
FIG. 5 is a block diagram showing the entire structure of a data terminal equipment 3a of FIG. 1.

As shown in FIG. 5, the data terminal equipment 3a of FIG. 1 includes a storage 31, a processing unit 32, an input unit 33, and a display unit 34. The storage 31 stores browser software Pbw for browsing the content data Dcnt. The browser software Pbw has a program Ptfc1 added thereto. The program Ptfc1, hereinafter referred to as authentication plug-in, provides the browser software Pbw with an authentication function unique to the present embodiment.

Figure 6:
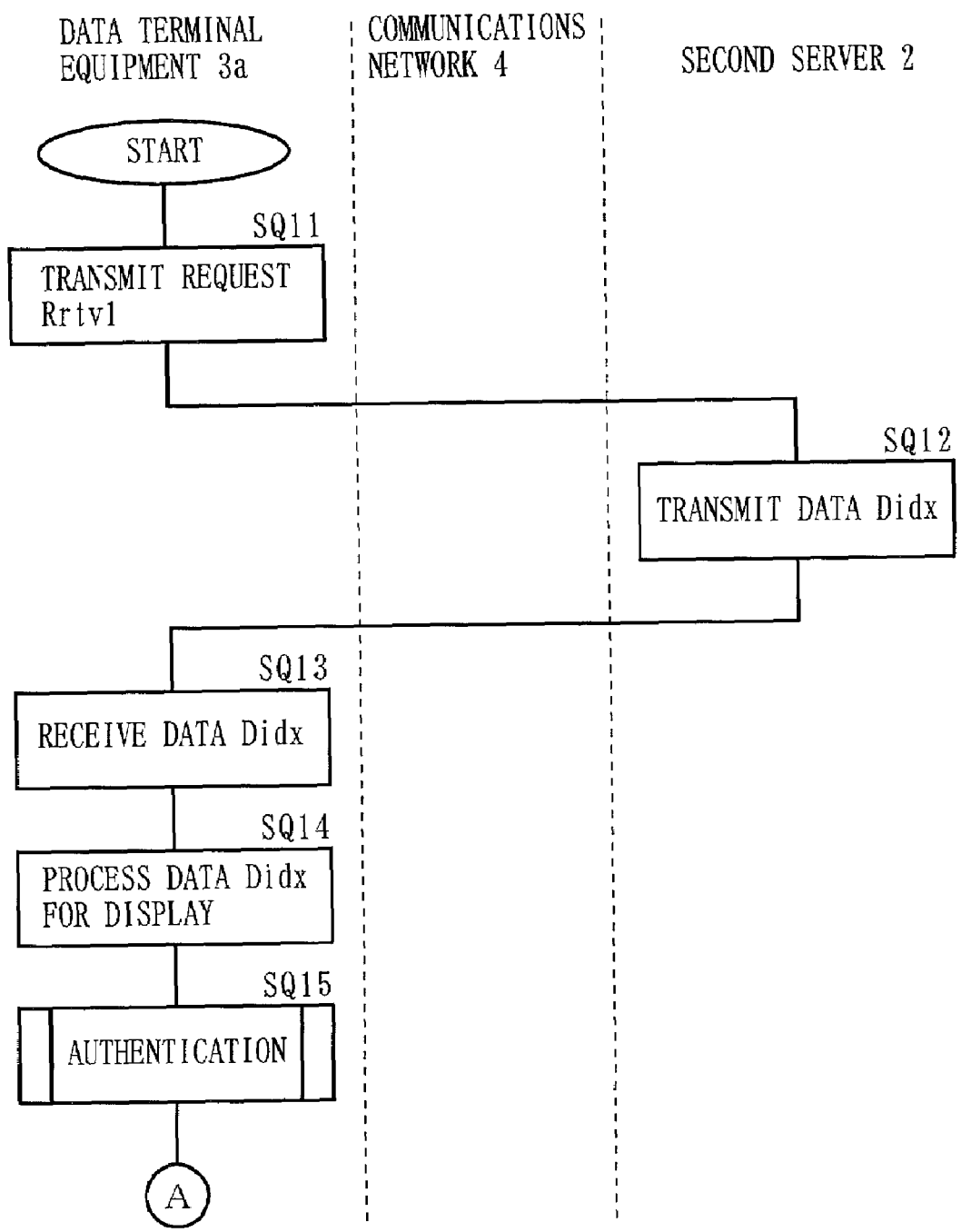
FIG. 6 is a sequence chart showing a first half of the procedure for receiving content data Dcnt by the data terminal equipment 3a of FIG. 1.
Figure 7:
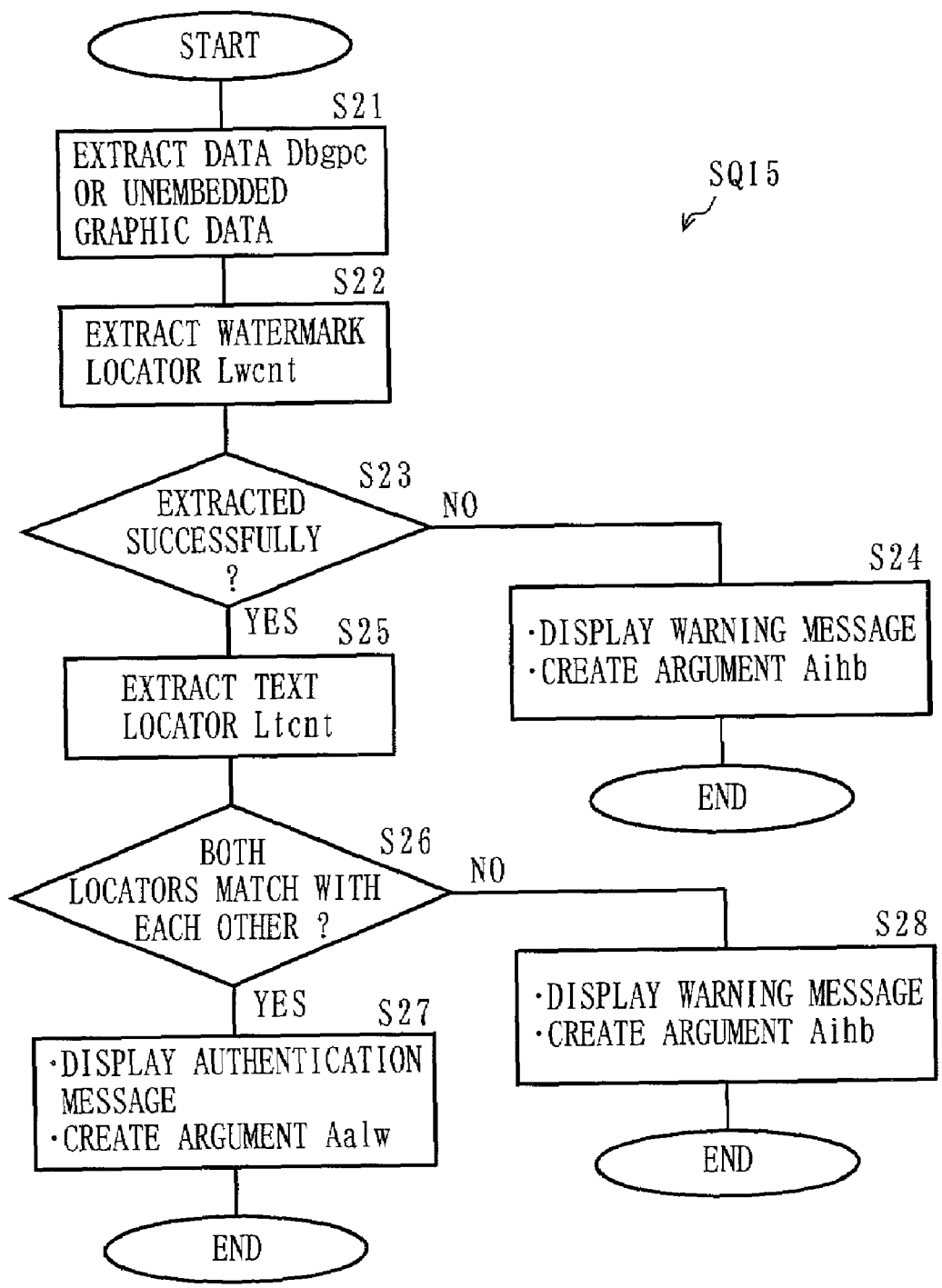
FIG. 7 is a flowchart showing the detailed procedure carried out by a processing unit 32 in sequence SQ15 of FIG. 6.
Figure 8:
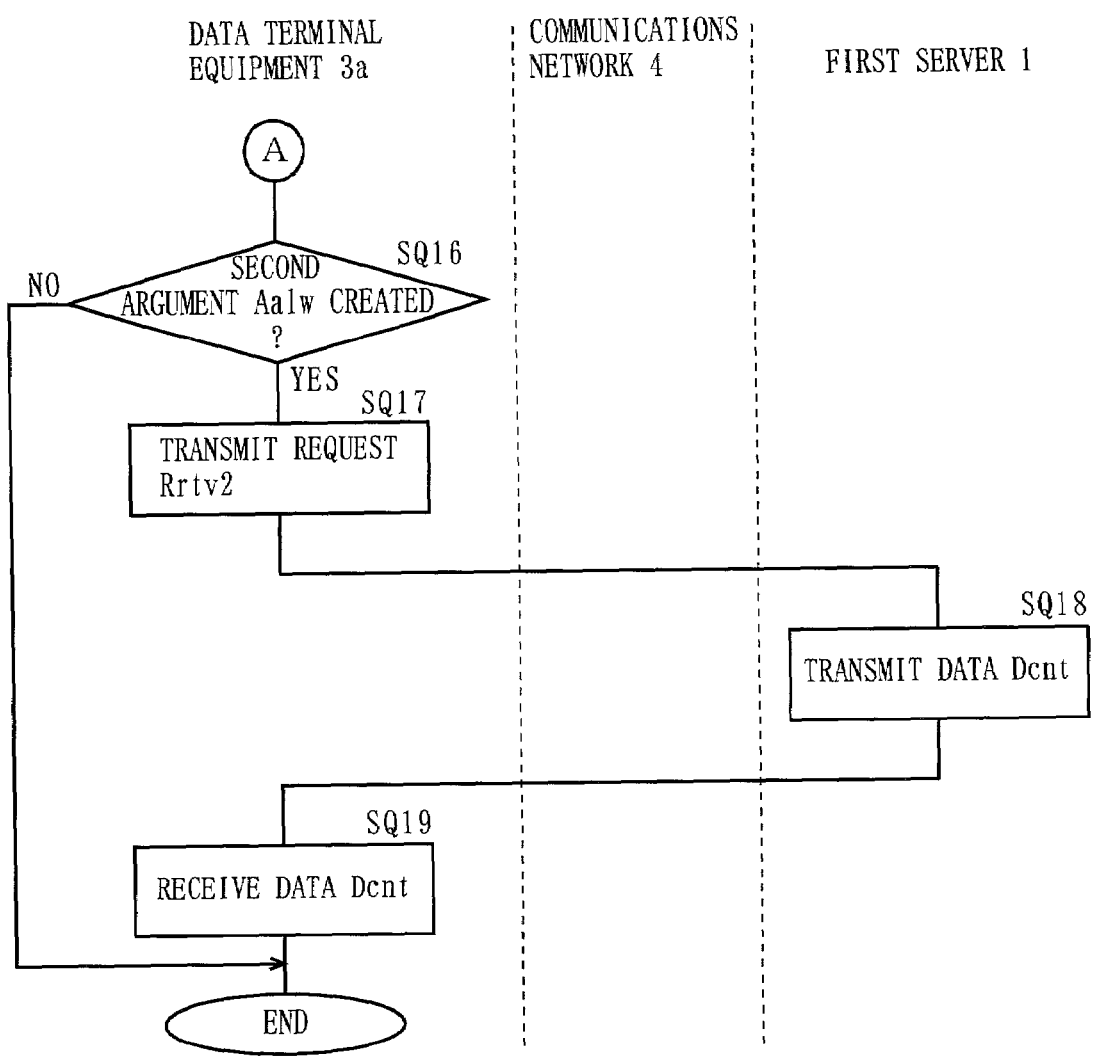
FIG. 8 is a sequence chart showing a second half of the procedure for receiving the content data Dcnt by the data terminal equipment 3a of FIG. 1.

With reference to FIGS. 6 to 8, described next is the procedure of retrieving the content data Dcnt by the data terminal equipment 3a in the above information providing system. First, the processing unit 32 of the data terminal equipment 3a starts executing the browser software Pbw stored in the storage 31. Then, by following an operation by the information user, the processing unit 32 transmits a first retrieval request Rrtv1 for specifying the second locator Lidx to the second server 2 through the communications network 4 (FIG. 6, sequence SQ11). In response to the first retrieval request Rrtv1, the second server 2 transmits the index data Didx stored therein to the data terminal equipment 3a through the communications network 4 (sequence SQ12). With the above procedure, the processing unit 32 retrieves the index data Didx (sequence SQ13). Then, the processing unit 32 analyzes the retrieved index data Didx, and causes the display unit 34 to display the analysis result (sequence SQ14).

The index data Didx includes the embedded graphic data Dbgpc. Therefore, the display unit 34 displays the image represented by the embedded graphic data Dbgpc (refer to FIG. 4). The index data Didx may also include graphic data other than the embedded graphic data Dgpc. Here, such other graphic data is similar to the embedded graphic data Dbgpc in that it is linked to predetermined content data, but different therefrom in that it is not embedded with any locator assigned to the content data. Therefore, such other graphic data is hereinafter referred to as unembedded graphic data, as required. Although not specifically shown in FIG. 4, the display unit 34 also displays an image represented by such unembedded graphic data, if any, included in the index data Didx. If the information user gets interested in the image contents represented by the embedded graphic data Dbgpc or other graphic data, he/she operates the input unit 33 to designate the image represented by the embedded graphic data Dbgpc or other graphic data. In response to this designation, the processing unit 32 executes the authentication plug-in Ptfc1, that is, starts an authentication process (sequence SQ15), in order to authenticate the embedded graphic data Dbgpc or other graphic data, and its linked content data.

FIG. 7 is a flowchart showing the detailed procedure carried out by the processing unit 32 in sequence SQ15. In FIG. 7, the processing unit 32 first extracts, from the retrieved index data Didx, the embedded graphic data Dbgpc or other graphic data designated by the information user (step S21). The processing unit 32 then extracts, from the data extracted in step S21, the first locator Lcnt embedded as the electronic watermark (step S22). If the unembedded graphic data is retrieved in step S21, this extraction process of step S22 is failed (step S23) because the unembedded graphic data is not embedded with the first locator Lcnt. If so, the processing unit 32 regards the unembedded graphic data and its linked content data as not authentic. Then, in step S24, the processing unit 32 causes the display unit 34 to display a warning message indicating that the content data linked to the unembedded graphic data may be undesirable to the information user. Furthermore, the processing unit 32 creates a first argument Aihb for inhibiting retrieval of the content data linked to the unembedded graphic data when the procedure returns to the process carried out by the browser software Pbw (step S24). After step S24, the processing unit 32 ends the authentication process, that is, ends the execution of the authentication plug-in Ptfc1.

On the other hand, if the extraction process is successfully carried out in step S22 (step S23), the procedure goes to step S25. Here, in the following description, the first locator Lcnt extracted in step S22 is hereinafter referred to as a watermark locator Lwcnt. In step S25, the processing unit 32 extracts, from text included in the tag in the index data Didx, the first locator Lcnt specifying the content data linked to the embedded graphic data Dbgpc. The extracted first locator Lcnt is hereinafter referred to as the text locator Ltcnt.

Next, the processing unit 32 checks whether the text locator Ltcnt matches with the watermark locator Lwcnt or not (step S26). If the text locator Ltcnt matches with the watermark locator Lwcnt, the processing unit 32 confirms the authenticity of the embedded graphic data Dbgpc and its linked content data Dcnt, verifying that they are owned by the same owner (that is, the first manager). Then, the processing unit 32 causes the display unit 34 to display an authentication message indicating the authenticity. Furthermore, the processing unit 32 creates a second argument Aalw for allowing retrieval of the content data linked to the embedded graphic data Dbgpc (step S27). Here, the second argument Aalw specifies the text locator Ltcnt as the content data linked to the embedded graphic data Dbgpc. After step S27, the processing unit 32 ends the execution of the authentication plug-in Ptfc1.

On the other hand, if the text locator Ltcnt does not match with the watermark locator Lwcnt, the processing unit 32 regards that a fraud typified by "spoofing" has been committed. One example of such fraud is now specifically described. First, an attacker makes a copy of the embedded graphic data Dbgpc out of the index data Didx. Based on the copy of the embedded graphic data Dbgpc that is owned by the real owner of the content data Dcnt, the attacker also creates fraudulent index data linked to fraudulent content data. Even with such fraud, however, tampering with the first locator Lcnt embedded as the electronic watermark is extremely difficult for the attacker. Therefore, if the text locator Ltcnt does not match with the watermark locator Lwcnt, the processing unit 32 determines in step S26 that the content data linked to the embedded graphic data Dbgpc may possibly be fraudulent one created by the attacker. If determining as such, the processing unit 32 carries out step S28, causing the display unit 34 to display a warning message indicating that the content data linked to the embedded graphic data Dbgpc may be undesirable to the information user. The processing unit 32 also creates the first argument Aihb. This first argument Aihb is similar to the one created in step S24, but different therefrom in that this inhibits retrieval of the content data linked to the embedded graphic data Dbgpc. After step S28, the processing unit 32 ends the execution of the authentication plug-in Ptfc1.

After the execution of the authentication plug-in Ptfc1, the processing unit 32 resumes the execution of the browser software Pbw. At this time, the processing unit 32 has created either one of the first or second argument Aihb or Aalw. Therefore, the processing unit 32 determines whether the first or second argument Aihb or Aalw has been created (FIG. 8, sequence SQ16). If determining that second argument Aalw has been created, the processing unit 32 transmits, to the first server 1 through the communications network 4, a second retrieval request Rrtv2 including the text locator Ltcnt specified by the second argument Aalw (sequence SQ17). In response to the second retrieval request Rrtv2, the first server 1 transmits the content data Dcnt to the data terminal equipment 3a through the communications network 4 (sequence SQ18). With the above procedure, the processing unit 32 of the data terminal equipment 3a retrieves the content data DCnt (sequence SQ19). Here, under the assumptions mentioned above, the content data Dcnt represents a Web page. Therefore, after sequence SQ19, the processing unit 32 analyzes the retrieved content data Dcnt, and causes the display unit 34 to display the analysis result. If the content data Dcnt is text data, the processing unit 32 causes, after sequence SQ19, the display unit 34 to display an image represented by the text data. If the content data Dcnt is video data, moving-picture data, or audio data, the processing unit 32 makes, after sequence SQ19, the data reproduced. If the content data Dcnt is a software program, the processing unit 32 stores, after sequence SQ19, the program typically in the storage 31. After sequence SQ19, the processing unit 32 ends the retrieval process of the content data Dcnt.

If determining in sequence SQ16 that the second argument Aalw has not been created, the processing unit 32 does not execute sequences SQ17 and thereafter, but immediately ends the retrieval process of the content data Dcnt.

As described in the foregoing, in the present information providing system, the index data Didx includes the embedded graphic data Dbgpc having the first locator Lcnt embedded therein as the electronic watermark. Furthermore, in the index data Didx, the embedded graphic data Dbgpc is linked to the content data Dcnt by text included in the tag. The data terminal equipment 3a carries out the authentication process shown in FIG. 7 before retrieval of the content data Dcnt and after designation of the embedded graphic data Dbgpc by the information user. With such authentication process, the processing unit 32 confirms the authenticity of the content data Dcnt linked to the embedded graphic data Dbgpc, based on the watermark locator Lwcnt and the text locator Ltcnt. Then, only if the authenticity of the content data Dcnt has been confirmed, the processing unit 32 accesses to the first server 1 for retrieving the content data Dcnt. As such, the data terminal equipment 3a can determine whether the content data Dcnt is authentic or not before retrieval thereof.

Furthermore, the above authentication process is carried out based on the index data Didx retrieved from the second server 2. Therefore, unlike the conventional art, excessive accesses to the authentication data terminal equipment located on the authorization agent side can be prevented.

Furthermore, in the above authentication process, the processing unit 32 causes the display unit 34 to display the warning message in step S24 or S28 if the extraction process in step S22 is failed or if the text locator Ltcnt does not match with the watermark locator Lwcn in step S26, respectively. Thus, the information user can know that it may undesirable to him/her to access to the content data linked to the unembedded graphic data or the embedded graphic data Dbgpc where the text locator Ltcnt does not match with the watermark locator Lwcn.

The Applicants have found Japanese Patent Laid-Open Publication No. 2000-148593, published on the same date as the date of application of the priority application of the present application. As with the art described in the Background Art section, the publication No. 2000-148593 discloses that the terminal of the information user cannot confirm the authenticity of data except for the one already retrieved.

In the above embodiment, as one preferred example for authentication, the first locator Lcnt is embedded in the graphic data Dgpc as the electronic watermark. As such, the electronic watermark technique is applied to the authentication process because it is difficult for the attacker to tamper with the embedded graphic data Dbgpc and embed an attacker's locator therein. Alternatively, an encryption technique may be applied to the authentication process.

Also, in the above embodiment, the processing unit 32 retrieves the content data Dcnt after it is determined in step S26 of the authentication process that the text locator Ltcnt matches with the watermark locator Lwcnt. This is not restrictive. Alternatively, if the watermark locator Lwcnt has been successfully extracted in the authentication process, the processing unit 32 may skip step S26, and immediately send the second retrieval request Rrtv2 including the watermark locator Lwcnt for retrieving the content data Dcnt. In this case, any content data linked to the embedded graphic data Dbgpc does not have to be specified by text included in the tag in the index data Didx. In other words, the text locator Ltcnt is not necessary.

Still further, in the above embodiment, the processing unit 32 executes the browser software Pbw for retrieving the index data Didx which serves as a basis of the authentication process. This is not restrictive. Alternatively, the index data Didx may be provided by an electronic mail. In this case, the processing unit 32 executes mailing software previously stored in the storage 31 for receiving the index data Didx included in the electronic mail.

Still further, in the above embodiment, description has been made under the assumption that the first locator Lcnt is embedded in the graphic data Dgpc (specifically, banner advertisement), that is, still-picture data. This is not restrictive. Alternatively, the first locator Lcnt may be embedded in video data including moving-picture data and audio data, or either one of those types of data. Here, moving-picture data or audio data is generally larger in size compared with still-picture data. Especially, the moving-picture data can be embedded with the first locator Lcnt for every frame. Therefore, extracting every first locator Lcnt embedded in the moving-picture and/or audio data is more difficult than extracting the one embedded in the still-picture data. Thus, the information providing system can be more "spoof"-proof.

Still further, in the above embodiment, the index data Didx is stored in the second server 2. This is not restrictive, and the index data Didx may alternatively be stored in the first server 1 or any other server.

Still further, in the above embodiment, the communications network 4 is the Internet. This is not restrictive, and the communications network 4 may alternatively be a LAN (Local Area Network) or any other network.

Still further, in the above embodiment, the first and second locators Lcnt and Lidx are both URLs. This is not restrictive, and the first and second locators Lcst and Lidx may be URIs (Uniform Resource Identifiers) or other locators that can specify the storage locations of the content data Dcnt and the index data Didx.

Still further, an expiration date may be set in the authentication plug-in Ptfc1 described in the above embodiment. More specifically, the authentication plug-in Ptfc1 is updated to a new version when the expiration date comes. The updated authentication plug-in Ptfc1 is so stored, exemplarily in a server managed by the authorization agency, as to be downloaded by the data terminal equipment 3a. In the data terminal equipment 3a, the processing unit 32 determines, before executing the authentication plug-in Ptfc1 (that is, before the start of sequence SQ15 of FIG. 6) whether the authentication plug-in Ptfc1 has been expired or not. If not expired, the processing unit 32 carries out the process of sequence SQ15 and thereafter. If expired, on the other hand, the processing unit 32 does not carry out the process of sequence SQ15 or thereafter. Furthermore, the processing unit 32 makes a message displayed, for example, for prompting the information user to download the updated authentication plug-in Ptfc1.

Figure 9:
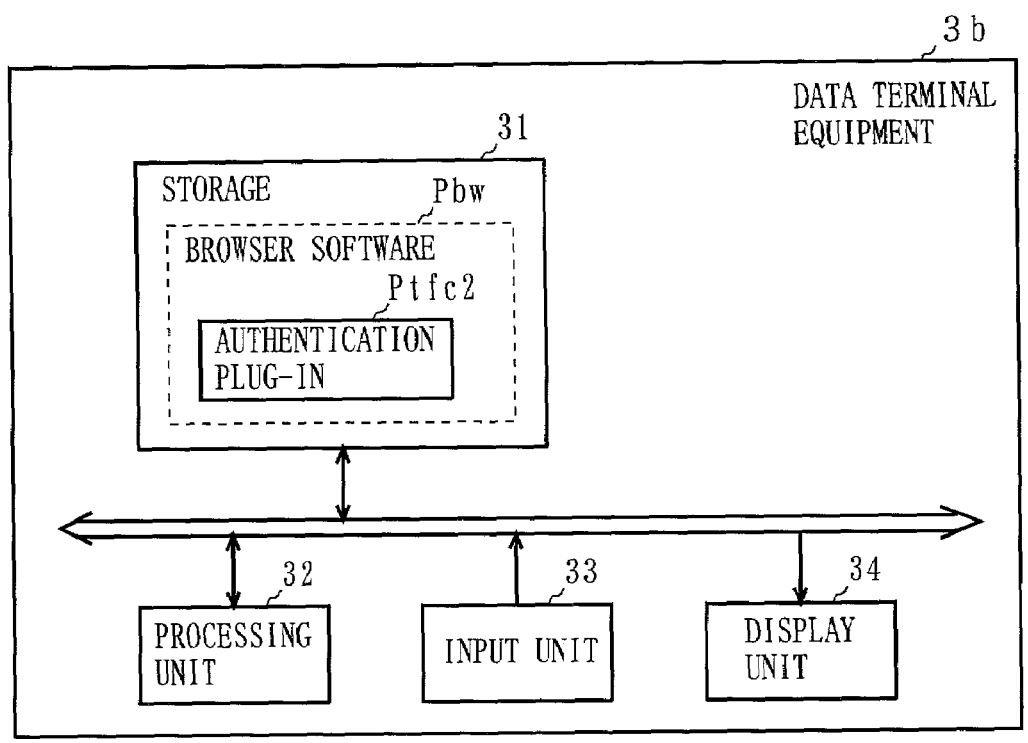

Described next is a data terminal equipment 3b, which is one exemplary modification of the data terminal equipment 3a shown in FIG. 1. As shown in FIG. 1, the data terminal equipment 3b is also included in the information providing system. As with the data terminal equipment 3a, the data terminal equipment 3b includes, as shown in FIG. 9, the storage 31, the processing unit 32, the input unit 33, and the display unit 34. The data terminal equipment 3b is similar to the data terminal equipment 3a in that the browser software Pbw is stored in the storage 31, but different therefrom in that the browser software Pbw of the data terminal equipment 3b incorporates a program (hereinafter, authentication plug-in) Ptfc2 for enabling an authentication function unique to this modification.

Figure 10:
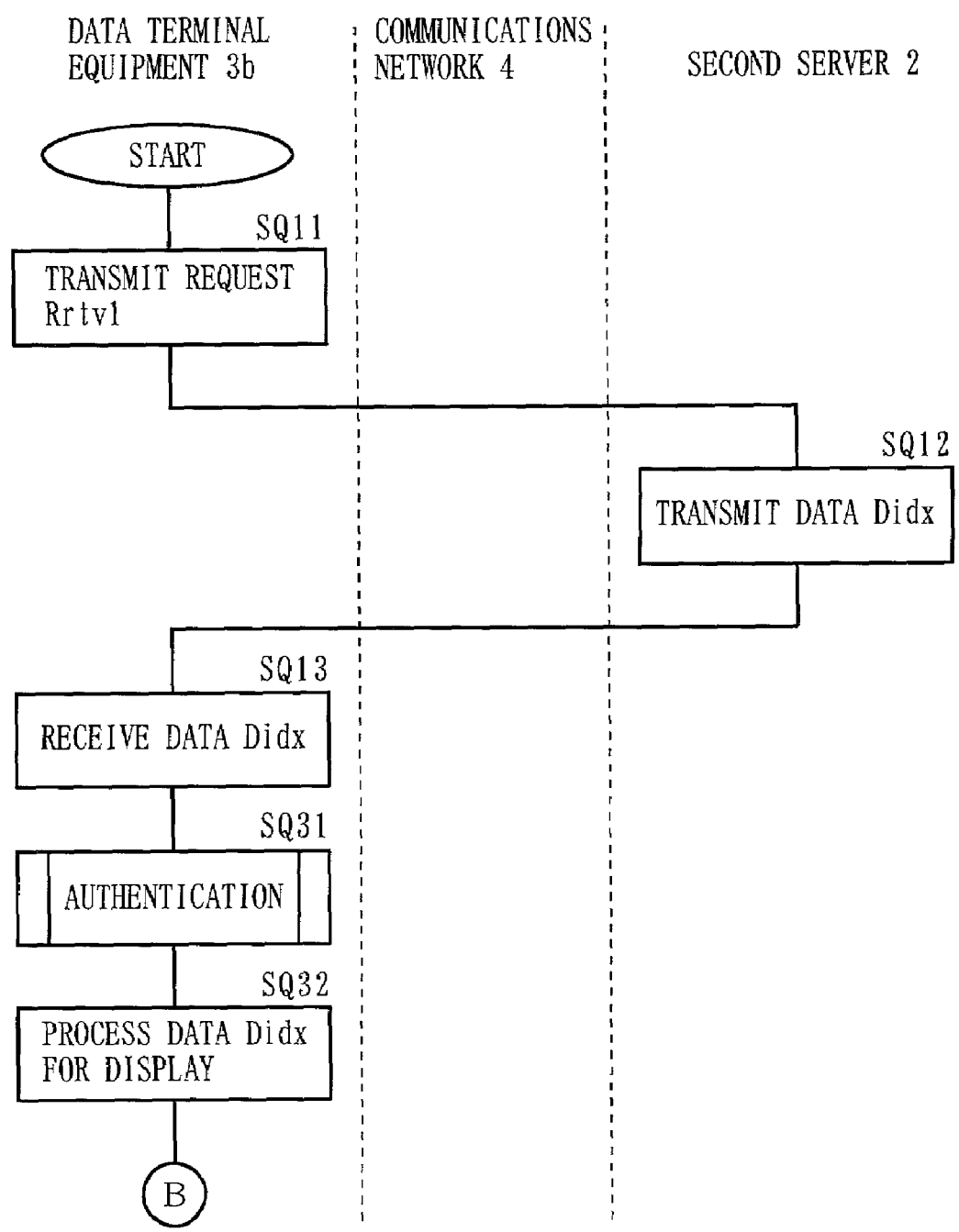
FIG. 10 is a sequence chart showing a first half of the procedure for receiving the content data Dcnt by the data terminal equipment 3b of FIG. 9.

With reference to sequence charts of FIGS. 10 to 12, described next is the procedure of retrieving the content data Dcnt by the data terminal equipment 3b in the above information providing system. First, the sequence chart of FIG. 10 is different from that of FIG. 6 in that sequences SQ31 and SQ32 are provided instead of sequences SQ14 and SQ15. Other than that, both sequence charts are the same and, therefore, components in FIG. 10 corresponding to those in FIG. 6 are provided with the same reference numerals, and not described herein. The processing unit 32 of the data terminal equipment 3b retrieves the index data Didx from the second server 2 through the communications network 4 by following the procedure of sequences SQ11 through SQ13 of FIG. 10.

After sequence SQ13, the processing unit 32 carries out authentication, that is, starts executing the authentication plug-in Ptfc2 (sequence SQ31). FIG. 11 is a flowchart showing the detailed procedure of the processing unit 32 in sequence SQ31. As stated above, the index data Didx may include not only the embedded graphic data Dbgpc, but also the unembedded graphic data that is linked to predetermined content data and is not embedded with a locator assigned to the content data. In FIG. 11, the processing unit 32 first selects any one of the embedded graphic data Dbgpc and other graphic data included in the retrieved index data Didx (step S41).

Next, the processing unit 32 carries out an extraction process similar to that in step S22 (step S42). The unembedded graphic data is not embedded with the first locator Lcnt and, therefore, if selected in step S41, the extraction process is failed (step S42). If so (step S43), the processing unit 32 creates the first argument Aihb for inhibiting a display process on the unembedded graphic data selected in step S41, and assigns the first argument Aihb to the unembedded graphic data (step S44). After step S44, the processing unit 32 carries out step S410, which will be described later.

On the other hand, the embedded graphic data Dbgpc is embedded with the first locator Lcnt. Therefore, if the processing unit 32 selects the embedded graphic data Dbgpc in step S41, the extraction process in step S42 is successfully carried out. Here, in this description, the first locator Lcnt extracted in step S42 is referred to as the watermark locator Lwcnt. If the extraction process has been successfully carried out (step S43), the processing unit 32 extracts, as the text locator Ltcnt, the first locator Lcnt specified by text included in the tag as the content data linked to the embedded graphic data Dbgpc selected this time (step S45).

Next, the processing unit 32 checks whether the text locator Ltcnt matches with the watermark locator Lwcnt (step S46). I f the text locator Ltcnt matches with the watermark locator Lwcnt, the processing unit 32 confirms the authenticity of the content data Dcnt linked to the embedded graphic data Dbgpc. The processing unit 32 also creates the second argument Aalw, and assigns the same to the selected embedded graphic data Dbgpc (step S47). Here, the second argument Aalw is the one for allowing the display process on the embedded graphic data Dbgpc when the processing unit 32 returns to the process carried out by the browser software Pbw. After step S47, the processing unit 32 executes step S49, which will be described later.

If the text locator Ltcnt does not match with the watermark locator Lwcnt, the processing unit 32 regards that the above stated "spoofing" has been carried out. Then, the processing unit 32 creates the first argument Aihb for inhibiting the display process on the embedded graphic data Dbgpc where the text locator Ltcnt does not match with the watermark locator Lwcnt (step S48).

After step S44, S47, or S48, the processing unit 32 determines whether there still remains any embedded graphic data Dbgpc or other graphic data unselected in the index data Didx (step S49). If determining there remains such data, the processing unit 32 returns to step S41 to repeat the procedure. On the other hand, if determining there is no such data, the processing unit 32 ends the execution of the authentication plug-in Ptfc2.

At the time of ending of the execution of the authentication plug-in Ptfc2, the processing unit 32 has created the first argument Aihb for each of the embedded graphic data Dbgpc where the text locator Ltcnt does not match with the watermark locator Lwcnt, and the unembedded graphic data. Or, the processing unit 32 has created the second argument Aalw for each of the embedded graphic data Dbgpc where the text locator Ltcnt matches with the watermark locator Lwcnt. After the authentication process shown in FIG. 11, the processing unit 32 resumes to execute the browser software Pbw for the display process on the retrieved index data Didx (FIG. 10; sequence SQ32). More specifically, as indicated by an arrow β 2 in FIG. 13, the processing unit 32 does not display any image represented by the embedded graphic data Dbgpc or the unembedded graphic data that is assigned the first argument Aihb (refer to a dotted box). Conversely, as indicated by an arrow α 2 in FIG. 13, the processing unit 32 displays the image represented by the embedded graphic data Dbgpc that is assigned the second argument Aalw. As such, the data terminal equipment 3b inhibits, in the above sequence SQ32, display of the image represented by the unembedded graphic data or the embedded graphic data Dbgpc where the text locator Ltcnt does not match with the watermark locator Lwcnt. Thus, the data terminal equipment 3b warns the information user that it may undesirable to him/her to access to the content data linked to those graphic data.

After the display process on the index data Didx in sequence SQ32, if the information user gets interested in the image contents represented by the embedded graphic data Dbgpc where the text locator Ltcnt matches with the watermark locator Lwcnt, he/she operates the input unit 33 to designate the image represented by the embedded graphic data Dbgpc. In response to this designation by the information user, the procedure goes to a sequence chart shown in FIG. 12. Here, the sequence chart of FIG. 12 is different from that of FIG. 8 only in that sequence SQ33 is provided instead of sequence SQ16. Therefore, the same sequences in FIG. 12 as those in FIG. 8 are provided with the same reference numerals, and not described herein. The processing unit 32 checks whether the embedded graphic data Dbgpc has been assigned the second argument Aalw (FIG. 12; sequence SQ33). If determining that the embedded graphic data Dbgpc has been assigned the second argument Aalw, the processing unit 32 extracts, from the index data Didx, the first locator Lcnt specifying the content data linked to the designated embedded graphic data Dbgpc. Then, the processing unit 32 retrieves the content data Dcnt by following the procedure of sequences SQ17 through SQ19. After sequence SQ19, the processing unit 32 ends the retrieval process of the content data Dcnt.

If determining in sequence SQ33 that the embedded graphic data Dbgpc has not been assigned the second argument Aalw, the processing unit 32 determines that the information user has erroneously designated the embedded graphic data Dbgpc or the unembedded graphic data whose linked content data may possibly be unauthorized. In this case, the processing unit 32 regards that presenting such graphic data may pose a danger to the information user, and therefore ends the retrieval process of the content data Dcnt without carrying out sequences SQ17 through SQ19.

Figure 11:
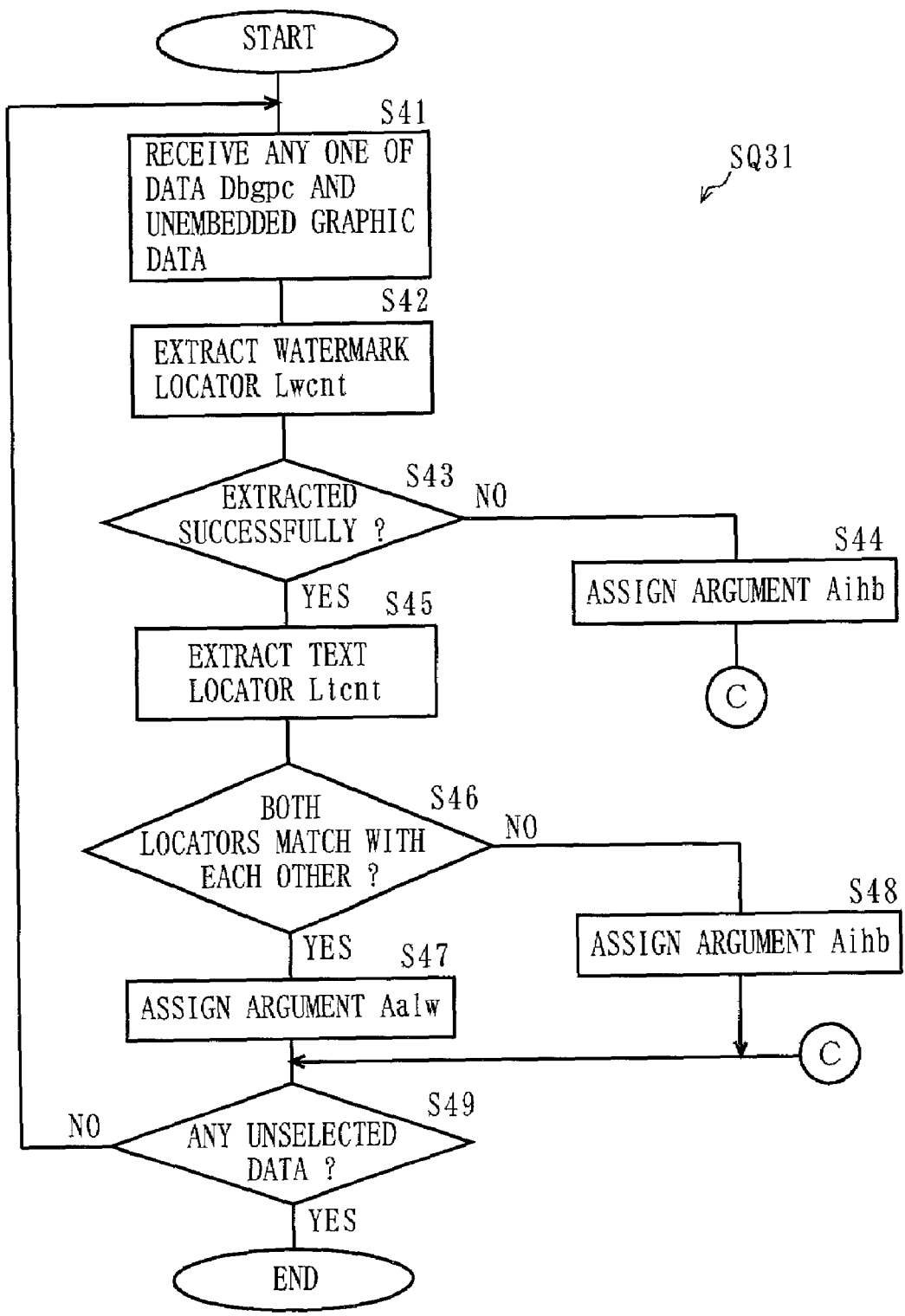
FIG. 11 is a flowchart showing the detailed procedure carried out by the processor unit 32 in sequence SQ31 of FIG. 10.
Figure 12:
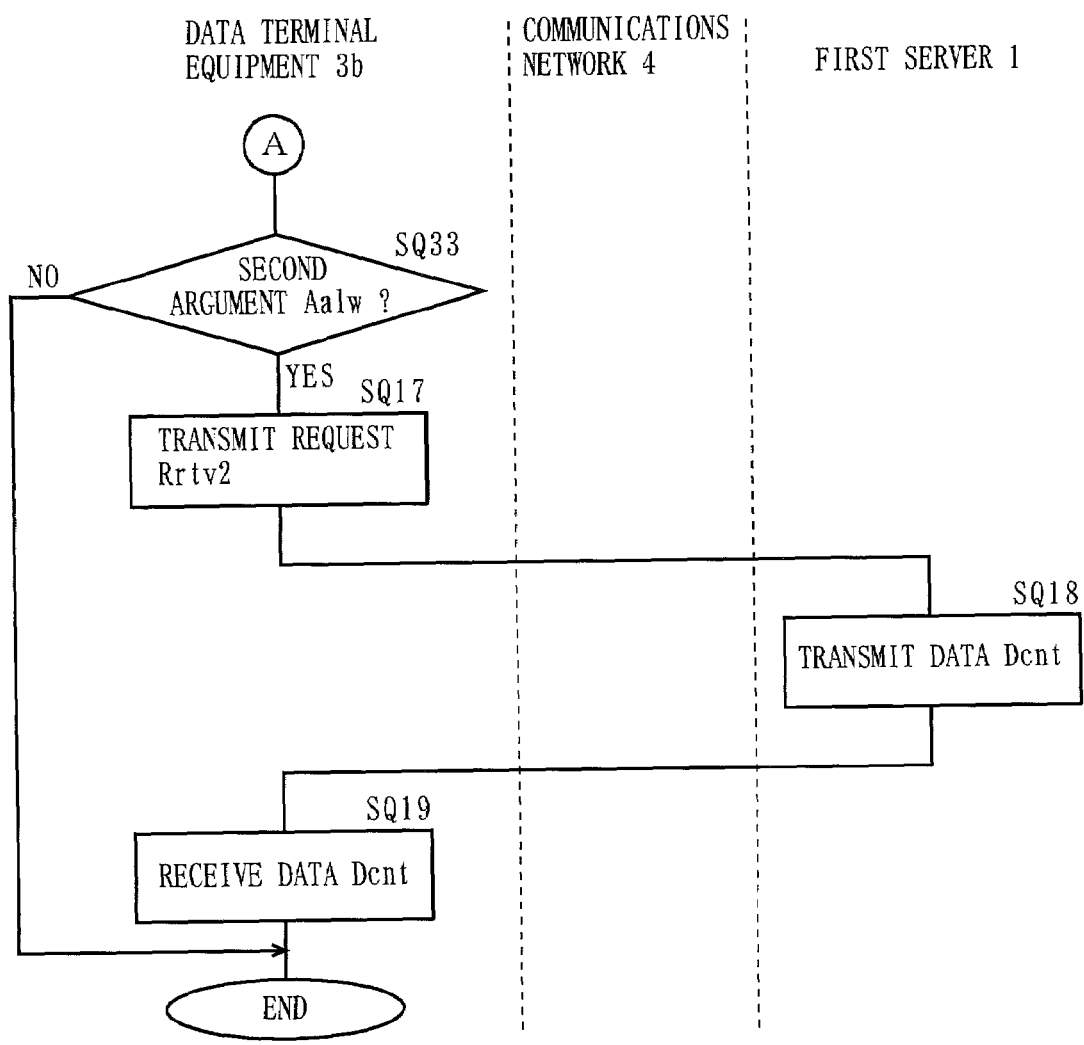
FIG. 12 is a sequence chart showing a second half of the procedure for receiving the content data Dcnt by the data terminal equipment 3b of FIG. 9.

As described in the above exemplary modification, the data terminal equipment 3b carries out the authentication process shown in FIG. 11 before designation of the embedded graphic data Dbgpc or the unembedded graphic data by the information user and after retrieval of the index data Didx. With the authentication process, the processing unit 32 authenticates the content data Dcnt linked to the embedded graphic data Dbgpc based on the watermark locator Lwcnt and the text locator Ltcnt. According to the authentication result, the processing unit 32 assigns the first argument Ainh or the second argument Aalw to the embedded graphic data Dbgpc. Then, the processing unit 32 carries out the display process only on the embedded graphic data having the second argument Aalw assigned thereto. Furthermore, only when the information user designates the embedded graphic data Dbgpc having the second argument Aalw assigned thereto, the processing unit 32 accesses to the first server 1 for retrieving the content data linked to the designated embedded graphic data Dbgpc. Thus, as with the data terminal equipment 3a, the data terminal equipment 3b can confirm the authenticity of the content data Dcnt before retrieval thereof.

The above authentication process is carried out by the data terminal equipment 3b based on the index data Didx retrieved from the second server 2. Therefore, unlike the conventional art, excessive accesses to the authentication data terminal equipment can be prevented.

Figure 13:
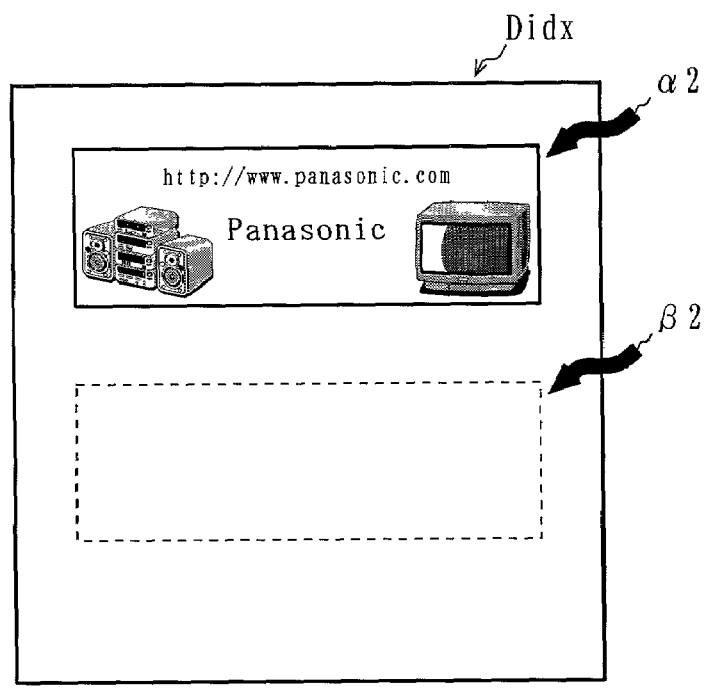
FIG. 13 illustrates one example of an image displayed on a display device 34.
Figure 14:
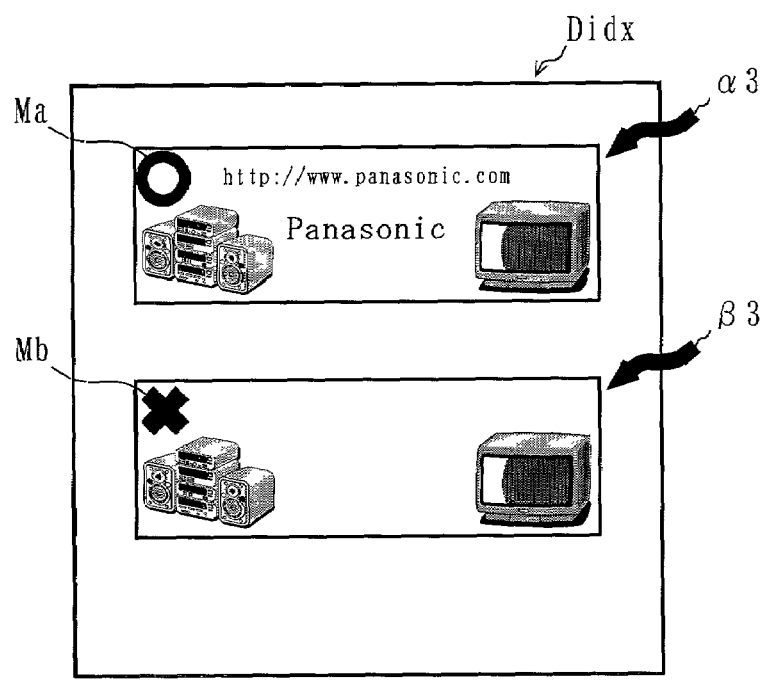
FIG. 14 illustrates another example of the image displayed on the display device 34.
Figure 15:
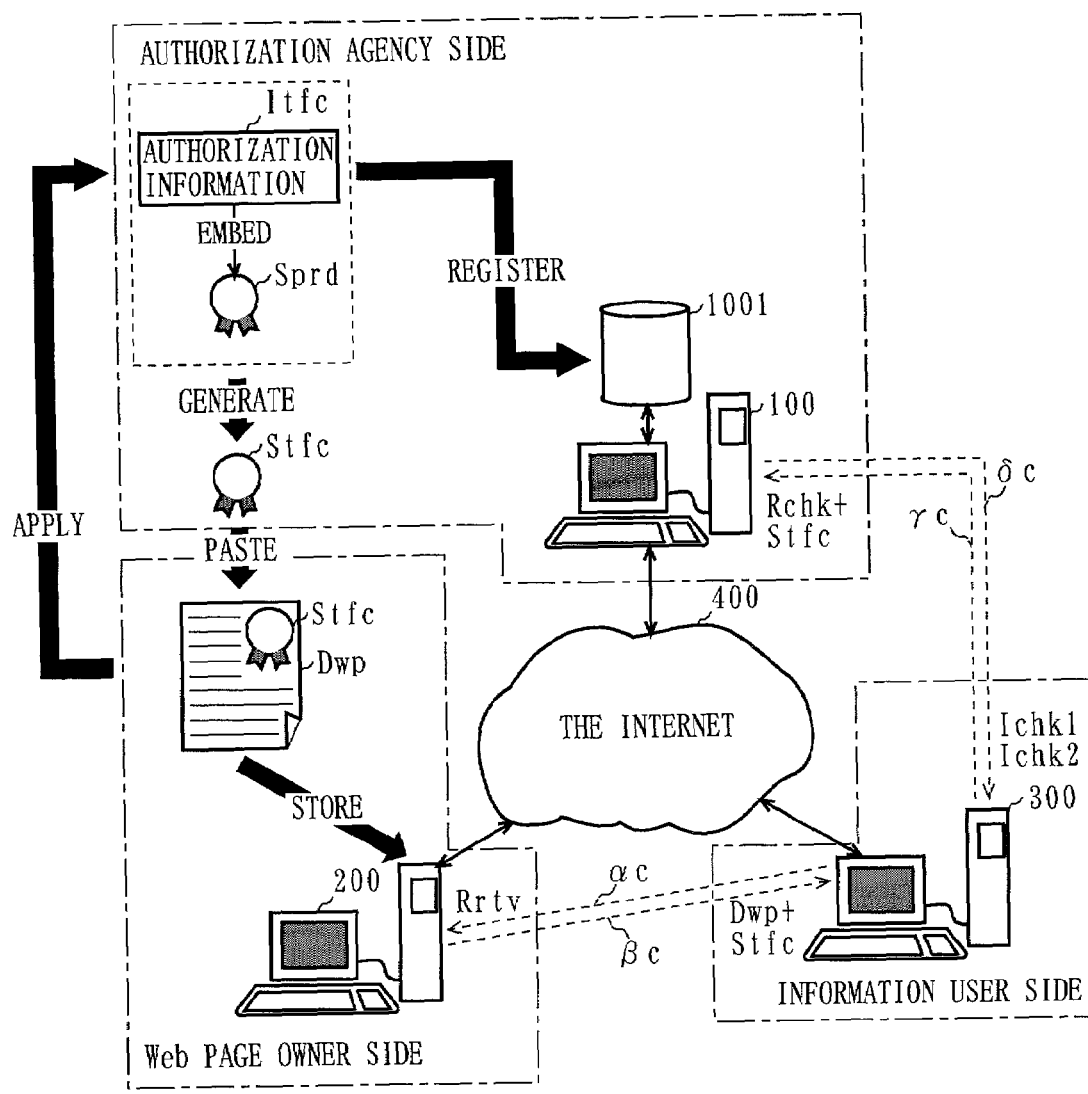
FIG. 15 is a diagram schematically illustrating a conventional authorization system.

In the above exemplary modification, as shown in FIG. 13, the processing unit 32 carries out the display process only on the embedded graphic data Dbgpc having the second argument Aalw assigned thereto. This is not restrictive. Alternatively, as indicated by an arrow α 3 in FIG. 14, the processing unit 32 may give a first mark Ma indicating that the authenticity has been confirmed, to the displayed image represented by the embedded graphic data Dbgpc having the second argument Aalw assigned thereto. Also, as indicated by an arrow β 3 in FIG. 14, the processing unit 32 may give a second mark Mb indicating that the authenticity has not been confirmed, to the displayed image represented by the embedded graphic data Dbgpc or the unembedded graphic data having the first argument Ainh assigned thereto.

The above stated authentication plug-ins Ptfc1 and Ptfc2 are stored in the storage 31. This is also not restrictive. These authentication plug-ins Ptfc1 and Ptfc2 may be distributed as being stored in a recording medium typified by a CD-ROM, or may be distributed through the above communications network 4.

While the invention has been described in detail, the foregoing description is in all aspects illustrative and not restrictive. It is understood that numerous other modifications and variations can be devised without departing from the scope of the invention.

What is claimed is:

1. A data terminal equipment for use in an information providing system where a server provides content data stored therein to said data terminal equipment which is placed on an information user's side for retrieving the content data through a communications network, said data terminal equipment comprising:
    an index retrieval part operable to retrieve index data indicating the content data prior to retrieving the content data;
    an authentication part operable to authenticate the content data by using the index data retrieved by said index retrieval part; and
    a content retrieval part operable to transmit a retrieval request for retrieving the authenticated content data to the server only if said authentication part has confirmed authenticity of the content data, and to receive the authenticated content data from the server, wherein:
    the content data is assigned a locator indicating information for specifying a storage location thereof;
    the index data includes embedded data in which the locator is embedded as an electronic watermark by an authorization agency; and
    said authentication part is operable to extract the locator from the embedded data included in the index data retrieved by said index retrieval part, and to confirm the authenticity of the content data if the locator is successfully extracted.

2. The data terminal equipment according to claim 1, further comprising:
    a display part operable to display a predetermined warning if said authentication part has not confirmed the authenticity of the content data.

3. The data terminal equipment according to claim 1, wherein the embedded data is moving-picture data and/or audio data.

4. The data terminal equipment according to claim 1, wherein the index data is provided by an electronic mail.

5. A data terminal equipment for use in an information providing system where a server provides content data stored therein to a data terminal equipment which is placed on an information user's side for retrieving the content data through a communications network, said data terminal equipment comprising:
   an index retrieval part operable to retrieve index data indicating the content data prior to retrieving the content data;
   an authentication part operable to authenticate the content data by using the index data retrieved by said index retrieval part; and
   a content retrieval part operable to transmit a retrieval request for retrieving the authenticated content data to the server only if said authentication part has confirmed authenticity of the content data, and to receive the authenticated content data from the server, wherein:
   the content data is assigned a locator indicating information for specifying a storage location thereof;
   the index data includes embedded data which is embedded with the locator as an electronic watermark by an authorization agency, and a location to which the content data is linked; and
   said authentication part is operable to extract the locator from the embedded data included in the index data retrieved by said index retrieval part, and to confirm the authenticity of the content data if the watermark locator is successfully extracted and the extracted locator matches with the location included in the index data retrieved by said index retrieval part.

6. The data terminal equipment according to claim 5, further comprising:
   a display part operable to display a predetermined warning if said authentication part has not confirmed the authenticity of the content data.

7. The data terminal equipment according to claim 5, wherein the embedded data is moving-picture data and/or audio data.

8. The data terminal equipment according to claim 5, wherein the index data is provided by an electronic mail.

9. In an information providing system where a server provides content data stored therein to a data terminal equipment placed on an information user side through a communications network, a method of retrieving the content data by the data terminal equipment, said method comprising:
   retrieving index data indicating the content data prior to retrieving the content data;
   authenticating the content data by using the index data retrieved in said retrieving; and
   transmitting a retrieval request for retrieving the content data to the server only if authenticity of the content data has been confirmed in said authenticating, and receiving the authenticated content from the server, wherein:
   the content data is assigned a locator indicating information for specifying a storage location thereof;
   the index data includes embedded data in which the locator is embedded as an electronic watermark by an authorization agency; and
   said authenticating further comprises
      extracting the watermark locator from the embedded data included in the index data retrieved in said retrieving, and
      confirming the authenticity of the content data if the watermark locator is successfully extracted in said extracting.

10. The data retrieval method according to claim 9, further comprising displaying a predetermined warning if the authenticity of the content data has not been confirmed in said authenticating.

11. The data retrieval method according to claim 9, wherein the embedded data is moving-picture data and/or audio data.

12. The data retrieval method according to claim 9, wherein the index data is provided by an electronic mail.

13. In an information providing system where a server provides content data stored therein to a data terminal equipment placed on an information user side through a communications network, a method of retrieving the content data by the data terminal equipment, said method comprising:
   retrieving index data indicating the content data prior to retrieving the content data;
   authenticating the content data by using the index data retrieved in said retrieving; and
   transmitting a retrieval request for retrieving the content data to the server only if authenticity of the content data has been confirmed in said authenticating, and receiving the authenticated content data from the server, wherein:
   the content data is assigned a locator indicating information for specifying a storage location thereof;
   the index data includes embedded data which is embedded with the locator as an electronic watermark by an authorization agency, and a location to which the content data is linked; and
   said authenticating further comprises
      extracting, as a watermark locator, the locator embedded as the electronic watermark from the embedded data included in the index data retrieved in said retrieving,
      extracting, as a text locator, the location from the index data retrieved in said retrieving if the watermark locator has been successfully extracted in said watermark locator extracting,
      determining whether the text locator extracted in said text locator extracting matches with the watermark locator extracted in said watermark locator extracting, and
      confirming the authenticity of the content data only if it is determined in said determining that the text locator matches with the watermark locator.

14. The data retrieval method according to claim 13, further comprising displaying a predetermined warning if the authenticity of the content data has not been confirmed in said authenticating.

15. The data retrieval method according to claim 13, wherein the embedded data is moving-picture data and/or audio data.

16. The data retrieval method according to claim 13, wherein the index data is provided by an electronic mail.

17. A recording medium having a program stored thereon, said program for retrieving content data by a data terminal equipment placed on an information user side in an information providing system in which a server provides the content data stored therein through a communications network, said program containing instructions readable by the data terminal equipment and operable to instruct the data terminal equipment to perform a method comprising:
   retrieving index data indicating the content data prior to retrieving the content data;
   authenticating the content data by using the index data retrieved in said retrieving; and
   transmitting a retrieval request for retrieving the content data to the server only if authenticity of the content data has been confirmed in said authenticating, and receiving the authenticated content data from the server, wherein:

the content data is assigned a locator indicating information for specifying a storage location thereof;

the index data includes embedded data in which the locator is embedded as an electronic watermark by an authorization agency; and said authenticating further comprises
extracting the locator from the embedded data included in the index data retrieved in said retrieving, and
confirming the authenticity of the content data if the watermark locater is successfully extracted in said extracting.

18. The recording medium according to claim 17, wherein the data terminal equipment readable instructions are further operable to instruct the data terminal equipment to:
display a predetermined warning if the authenticity of the content data has not been confirmed in said authenticating.

19. The recording medium according to claim 17, wherein the embedded data is moving-picture data and/or audio data.

20. The recording medium according to claim 17, wherein the index data is provided by an electronic mail.

21. A recording medium having a program stored thereon, said program for retrieving content data by a data terminal equipment placed on an information user side in an information providing system in which a server provides the content data stored therein through a communications network, said program containing instructions readable by the data terminal equipment and operable to instruct the data terminal equipment to perform a method comprising:

retrieving index data indicating the content data prior to retrieving the content data;

authenticating the content data by using the index data retrieved in said retrieving; and transmitting a retrieval request for retrieving the content data to the server only if authenticity of the content data has been confirmed in said authenticating, and receiving the authenticated content data from the server, wherein:

the content data is assigned a locator indicating information for specifying a storage location thereof;

the index data includes embedded data which is embedded with the locator as an electronic watermark by an authorization agency, and a location to which the content data is linked; and said authenticating further comprises
extracting, as a watermark locator, the locator embedded as the electronic watermark from the embedded data included in the index data retrieved in said retrieving,
extracting, as a text locator, the location from the index data retrieved in said retrieving if the watermark locator has been successfully extracted in said watermark locator extracting,
determining whether the text locator extracted in said text locator extracting matches with the watermark locator extracted in said watermark locator extracting, and
authenticating the content data only if it is determined in said determining that the text locator matches with the watermark locator.

22. The recording medium according to claim 21, wherein said program is further operable to instruct the data terminal equipment to:

display a predetermined warning if the authenticity of the content data has not been confirmed in said authenticating.

23. The recording medium according to claim 21, wherein the embedded data is moving-picture data and/or audio data.

24. The recording medium according to claim 21, wherein the index data is provided by an electronic mail.

25. A program for retrieving content data by a data terminal equipment placed on an information user side in an information providing system in which a server provides the content data stored therein through a communications network, said program being stored on a computer readable medium, and said program containing instructions readable by the data terminal equipment and operable to instruct the data terminal equipment to perform a method comprising:

retrieving index data indicating the content data prior to retrieving the content data;

authenticating the content data by using the index data retrieved in said retrieving; and transmitting a retrieval request for retrieving the content data to the server only if authenticity of the content data has been confirmed in said authenticating, and receiving the authenticated content data from the server, wherein:

the content data is assigned a locator indicating information for specifying a storage location thereof;

the index data includes embedded data in which the locator is embedded as an electronic watermark by an authorization agency; and said authenticating further comprises
extracting the locator from the embedded data included in the index data retrieved in said retrieving, and
confirming the authenticity of the content data if the watermark locater is successfully extracted in said extracting.

26. The program according to claim 25, wherein said method further comprises displaying a predetermined warning if the authenticity of the content data has not been confirmed in said authenticating.

27. The program according to claim 25, wherein the embedded data is moving-picture data and/or audio data.

28. The program according to claim 25, wherein the index data is provided by an electronic mail.

29. A program for retrieving content data by a data terminal equipment placed on an information user side in an information providing system in which a server provides the content data stored therein through a communications network, said program being stored on a computer readable medium, and said program containing instructions readable by the data terminal equipment and operable to instruct the data terminal equipment to perform a method comprising:

retrieving index data indicating the content data prior to retrieving the content data;

authenticating the content data by using the index data retrieved in said retrieving; and transmitting a retrieval request for retrieving the content data to the server only if authenticity of the content data has been confirmed in said authenticating, and receiving the authenticated content data from the server, wherein:

the content data is assigned a locator indicating information for specifying a storage location thereof;

the index data includes embedded data embedded with the locator as an electronic watermark by an authorization agency, and a location to which the content data is linked; and said authenticating further comprises extracting, as a watermark locator, the locator embedded as the electronic watermark from the embedded data included in the index data retrieved said retrieving, extracting, as a text locator, the location from the index data retrieved in said retrieving if the watermark locator has been successfully extracted in said watermark locator extracting, determining whether the text locator extracted in said text locator extracting matches with the watermark locator extracted in said watermark locator extracting, and confirming the authenticity of the content data only if it is determined in said determining that the text locator matches with the watermark locator.

30. The program according to claim 29, wherein said method further comprises displaying a predetermined warning if the authenticity of the content data has not been confirmed in said authenticating.

31. The program according to claim 29, wherein the embedded data is moving-picture data and/or audio data.

32. The program according to claim 29, wherein the index data is provided by an electronic mail.

* * * * *